US012700672B2

(12) United States Patent
Tezuka et al.

(10) Patent No.: US 12,700,672 B2
(45) Date of Patent: Aug. 4, 2026

(54) ANTENNA AND DISPLAY DEVICE

(71) Applicant: TDK CORPORATION, Tokyo (JP)

(72) Inventors: Kenichi Tezuka, Tokyo (JP); Mei Fukaya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 53 days.

(21) Appl. No.: 18/724,918

(22) PCT Filed: Dec. 27, 2022

(86) PCT No.: PCT/JP2022/048366

§ 371 (c)(1),
(2) Date: Jun. 27, 2024

(87) PCT Pub. No.: WO2023/127913

PCT Pub. Date: Jul. 6, 2023

(65) Prior Publication Data

US 2025/0105515 A1 Mar. 27, 2025

(30) Foreign Application Priority Data

Dec. 28, 2021 (JP) ................................ 2021-214184

(51) Int. Cl.
*H01Q 5/378* (2015.01)
*H01Q 1/38* (2006.01)
*H01Q 13/08* (2006.01)

(52) U.S. Cl.
CPC ............... *H01Q 5/378* (2015.01); *H01Q 1/38* (2013.01); *H01Q 13/08* (2013.01)

(58) Field of Classification Search
CPC .......... H01Q 5/378; H01Q 1/38; H01Q 13/08; H01Q 5/385
See application file for complete search history.

(56) References Cited

U.S. PATENT DOCUMENTS 3,445,849 A * 5/1969 Sanford ................. H01Q 1/085 343/702
3,803,623 A * 4/1974 Charlot, Jr. .......... H01Q 21/065 343/846
3,921,177 A * 11/1975 Munson ............... H01Q 9/0435 343/846
4,089,003 A * 5/1978 Conroy ................ H01Q 9/0414 343/846

(Continued)

FOREIGN PATENT DOCUMENTS

CN 115332793 A * 11/2022 ............... H01Q 1/52
JP H06-276013 A 9/1994

(Continued)

OTHER PUBLICATIONS

Jun. 20, 2024, International Preliminary Report on Patentability issued in International Patent Application No. PCT/JP2022/048366.

*Primary Examiner* — Dameon E Levi
*Assistant Examiner* — Jordan E. DeWitt
(74) *Attorney, Agent, or Firm* — Oliff PLC

(57) ABSTRACT

An antenna includes a radiation conductor having a circular shape, a feed line configured to feed power to the radiation conductor, and a terminal connected to the feed line, in which impedance of the feed line is greater than impedance of a feed point of the terminal, and a line length of the feed line is longer than a radius of the radiation conductor.

13 Claims, 14 Drawing Sheets

(56) References Cited

U.S. PATENT DOCUMENTS

| | | | | | |
|---|---|---|---|---|---|
| 4,123,758 | A * | 10/1978 | Shibano | H01Q 9/0407 343/845 |
| 4,197,544 | A * | 4/1980 | Kaloi | H01Q 9/0407 343/846 |
| 7,679,566 | B2 * | 3/2010 | Higasa | H01Q 1/2291 343/846 |
| 9,082,307 | B2 * | 7/2015 | Sharawi | H01Q 9/16 |
| 11,710,891 | B2 * | 7/2023 | Ryu | H01Q 1/44 343/700 MS |
| 11,824,282 | B2 * | 11/2023 | Lee | H01Q 1/243 |
| 2006/0220977 | A1 * | 10/2006 | Ogino | H01Q 7/00 343/866 |
| 2011/0227795 | A1 * | 9/2011 | Lopez | H01Q 1/243 343/700 MS |
| 2019/0305425 | A1 * | 10/2019 | Jamaly | H01Q 9/265 |
| 2020/0106184 | A1 * | 4/2020 | Fabrega Sanchez | H01Q 9/285 |
| 2020/0136269 | A1 * | 4/2020 | Choi | G06K 19/07786 |
| 2021/0066790 | A1 * | 3/2021 | Park | H01Q 1/405 |
| 2022/0140495 | A1 * | 5/2022 | Kim | H01Q 9/0407 343/700 MS |
| 2022/0247083 | A1 * | 8/2022 | Kim | H01Q 21/24 |
| 2022/0263224 | A1 * | 8/2022 | Kim | H01Q 5/385 |
| 2022/0271412 | A1 * | 8/2022 | Choi | H01Q 21/24 |
| 2022/0328955 | A1 * | 10/2022 | Park | H01Q 1/38 |
| 2023/0006334 | A1 * | 1/2023 | Lee | H01Q 5/385 |
| 2023/0006349 | A1 * | 1/2023 | Lee | H01Q 21/24 |
| 2023/0006356 | A1 * | 1/2023 | Yoon | H01Q 9/065 |
| 2023/0006363 | A1 * | 1/2023 | Yoon | H01Q 1/44 |
| 2023/0108271 | A1 * | 4/2023 | Park | H01Q 1/38 343/725 |
| 2023/0420852 | A1 * | 12/2023 | Lee | G01S 13/58 |
| 2025/0063818 | A1 * | 2/2025 | Shingai | H10D 86/441 |
| 2025/0105524 | A1 * | 3/2025 | Lee | H01Q 5/378 |

FOREIGN PATENT DOCUMENTS

| | | | | | |
|---|---|---|---|---|---|
| JP | 2004208069 | A * | 7/2004 | |
| WO | WO-2023127913 | A1 * | 7/2023 | H01Q 5/385 |
| WO | WO-2023171718 | A1 * | 9/2023 | H01Q 13/08 |

* cited by examiner $Z_{in}$ : INPUT IMPEDANCE
$Z$ : CHARACTERISTIC IMPEDANCE
$Z_L$ : LOAD IMPEDANCE (b)

(a)

(a)

(b)

ANTENNA AND DISPLAY DEVICE

TECHNICAL FIELD

The present disclosure relates to an antenna and a display device.

BACKGROUND ART

Conventionally, an antenna is known which includes a radiating element and a feed strip element connected to the radiating element (for example, Patent Literature 1). In the antenna, the length d of the strip element is set to a range of $0<d\leq 0.125x$ where the length of the radiating element is x.

CITATION LIST

Patent Literature

Patent Literature 1: Japanese Unexamined Patent Publication No. H6-276013

An antenna according to an aspect of the present disclosure includes a radiation conductor having a circular shape, a feed line configured to feed power to the radiation conductor, and a terminal connected to the feed line, in which impedance of the feed line is greater than impedance of a feed point of the terminal, and a line length of the feed line is longer than a radius of the radiation conductor.

A display device according to an aspect of the present disclosure includes the antenna described above.

DESCRIPTION OF EMBODIMENTS

Here, in the antenna as described above, it has been required to obtain good return loss characteristics in a wide band.

To address this, an object of the present disclosure is to provide an antenna capable of obtaining good return loss characteristics in a wide band, and a display device.

According to an aspect of the present disclosure, it is possible to provide an antenna capable of obtaining good return loss characteristics in a wide band, and a display device.

Hereinafter, some embodiments of the present disclosure will be described in detail. However, the present disclosure is not limited to the following embodiments.

Figure 1:
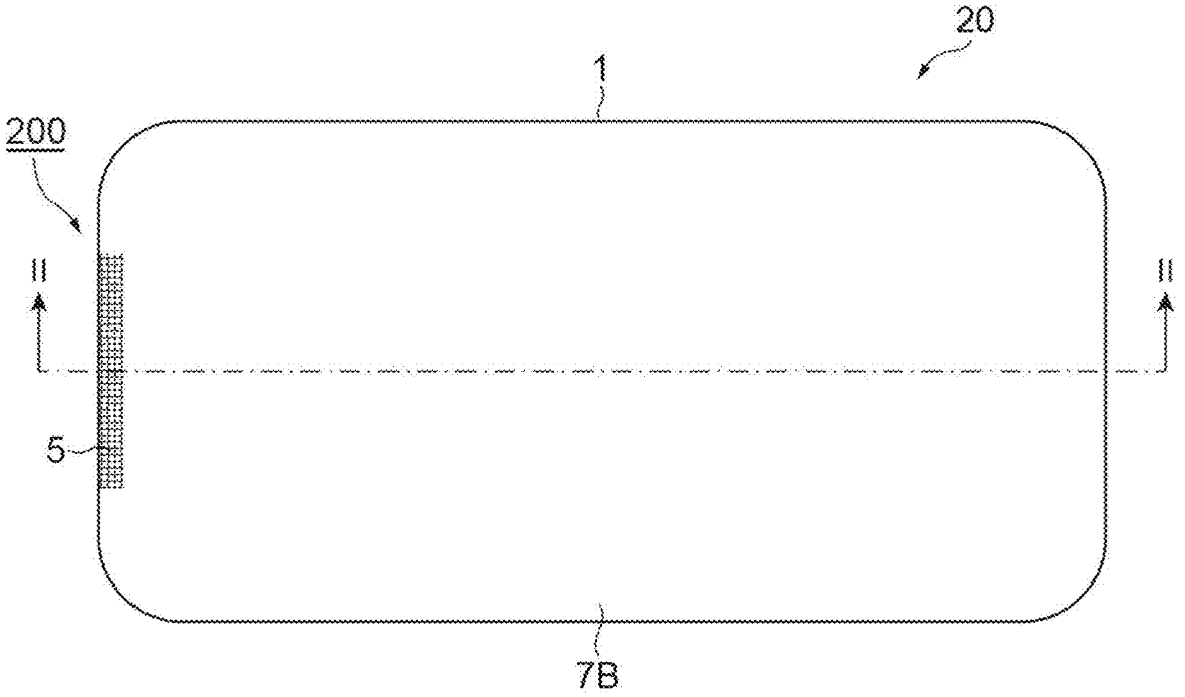
FIG. 1 is a plan view illustrating an electroconductive film including an antenna according to an embodiment.
Figure 2:
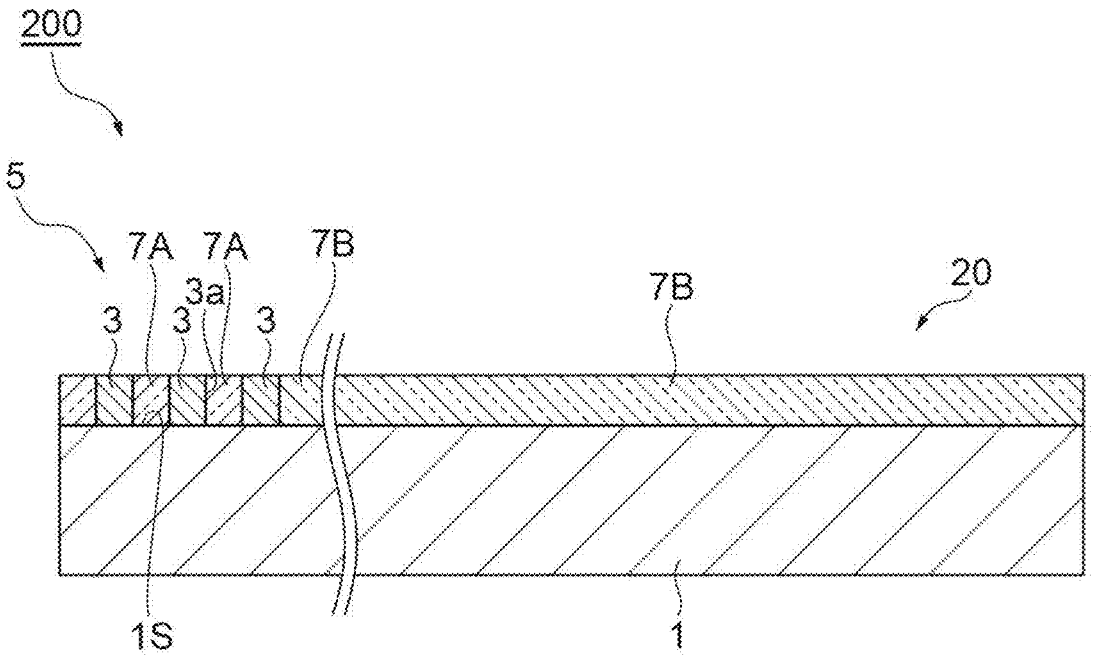
FIG. 2 is a cross-sectional view taken along the line II-II in FIG. 1.

FIG. 1 is a plan view illustrating an electroconductive film including an antenna according to an embodiment of the present disclosure, and FIG. 2 is a cross-sectional view taken along the line II-II in FIG. 1. An electroconductive film 20 illustrated in FIGS. 1 and 2 includes a film-like light transmissive substrate 1 (substrate), an electroconductive layer 5 provided on one main surface 1S of the light transmissive substrate 1, and a light transmissive resin layer 7B provided on that one main surface 1S of the light transmissive substrate 1. The electroconductive layer 5 includes a conductor portion 3 that includes a part having a pattern extending in a direction along the main surface 1S of the light transmissive substrate 1 and including a plurality of openings 3*a*, and an insulating resin portion 7A filling the openings 3*a* of the conductor portion 3. In FIG. 2, the electroconductive layer 5 is illustrated in a deformed manner, and the width of the conductor portion 3 is illustrated in an emphasized manner. The thickness of each layer is also illustrated in a deformed manner. Details of the thickness of each layer will be described later. In the example illustrated in FIG. 1, the electroconductive layer 5 is formed near one short side of the electroconductive film 20, but the position where the electroconductive layer 5 is formed is not particularly limited, and the electroconductive layer 5 may be formed near a long side.

The light transmissive substrate 1 has optical transparency to an extent required when the electroconductive film 20 is incorporated in a display device. Specifically, the total light transmittance of the light transmissive substrate 1 may be 90 to 100%. The light transmissive substrate 1 may have a haze of 0 to 5%.

The light transmissive substrate 1 may be, for example, a transparent resin film, and examples thereof include a film of polyethylene terephthalate (PET), polycarbonate (PC), polyethylene naphthalate (PEN), cycloolefin polymer (COP), or polyimide (PI). Alternatively, the light transmissive substrate 1 may be a glass substrate.

Figure 3:
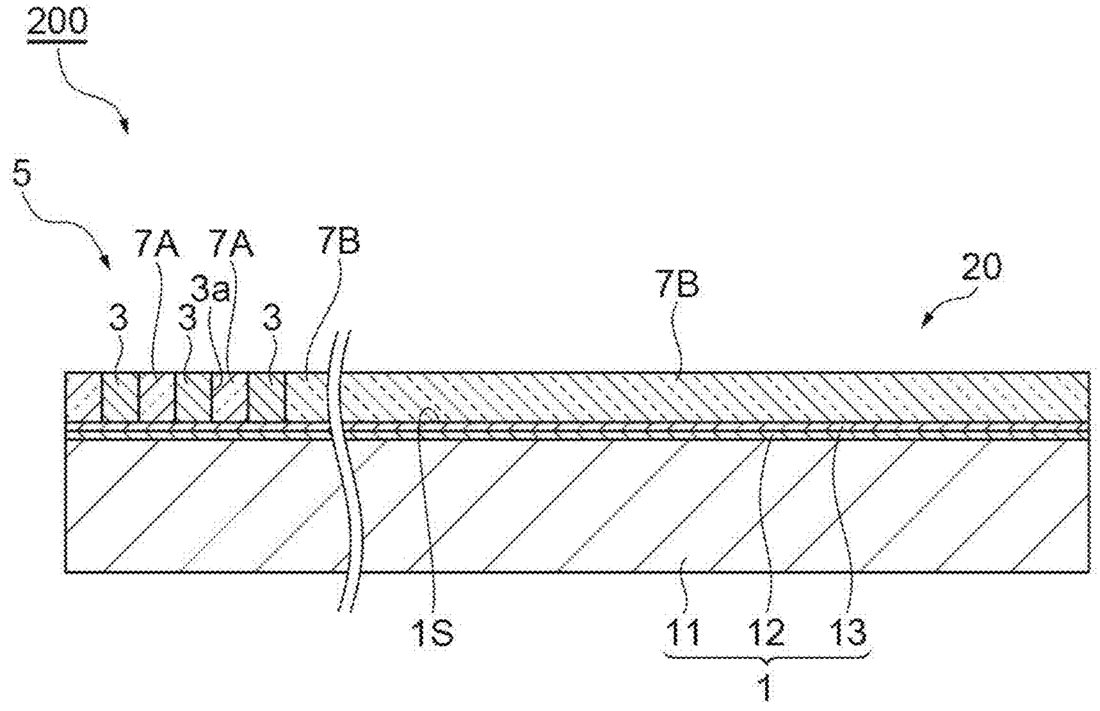
FIG. 3 is a cross-sectional view illustrating an antenna according to a modification.

For example, as illustrated in FIG. 3, the light transmissive substrate 1 may be a laminate including a light transmissive support film 11, and an intermediate resin layer 12 and an underlying layer 13 sequentially provided on the support film 11. The support film 11 can be the transparent resin film. The underlying layer 13 is a layer provided in order to form the conductor portion 3 by electroless plating or the like. In a case where the conductor portion 3 is formed by another method, the underlying layer 13 is not necessarily provided. It is not essential that the intermediate resin layer 12 is provided between the support film 11 and the underlying layer 13.

The thickness of the light transmissive substrate 1 or the support film 11 constituting the same may be 10 μm or more, 20 μm or more, or 35 μm or more, and may be 500 μm or less, 200 μm or less, or 100 μm or less.

Providing the intermediate resin layer 12 can improve adhesion between the support film 11 and the underlying layer 13. In a case where the underlying layer 13 is not provided, the intermediate resin layer 12 is provided between the support film 11 and the light transmissive resin layer 7B, so that adhesion between the support film 11 and the light transmissive resin layer 7B can be improved.

The intermediate resin layer 12 may be a layer containing a resin and an inorganic filler. Examples of the resin constituting the intermediate resin layer 12 include an acrylic resin. Examples of the inorganic filler include silica.

The thickness of the intermediate resin layer 12 may be, for example, 5 nm or more, 100 nm or more, or 200 nm or more, and may be 10 μm or less, 5 μm or less, or 2 μm or less.

The underlying layer 13 may be a layer containing a catalyst and a resin. The resin may be a cured product of a curable resin composition. Examples of a curable resins contained in the curable resin composition include an amino resin, a cyanate resin, an isocyanate resin, a polyimide resin, an epoxy resin, an oxetane resin, a polyester, an allyl resin, a phenolic resin, a benzoxazine resin, a xylene resin, a ketone resin, a furan resin, a COPNA resin, a silicon resin, a dicyclopentadiene resin, a benzocyclobutene resin, an episulfide resin, a thiol-ene resin, a polyazomethine resin, a polyvinyl benzyl ether compound, acenaphthylene, and an ultraviolet curable resin containing a functional group that causes a polymerization reaction with ultraviolet rays such as an unsaturated double bond, a cyclic ether, and a vinyl ether.

The catalyst contained in the underlying layer 13 may be an electroless plating catalyst. The electroless plating catalyst may be a metal selected from Pd, Cu, Ni, Co, Au, Ag, Pd, Rh, Pt, In, and Sn, or may be Pd. The catalyst may be one kind alone or a combination of two or more kinds. Usually, the catalyst is dispersed in the resin as catalyst particles.

The content of the catalyst in the underlying layer 13 may be 3 mass % or more, 4 mass % or more, or 5 mass % or more, and may be 50 mass % or less, 40 mass % or less, or 25 mass % or less with respect to the total amount of the underlying layer 13.

The thickness of the underlying layer 13 may be 10 nm or more, 20 nm or more, or 30 nm or more, and may be 500 nm or less, 300 nm or less, or 150 nm or less.

The light transmissive substrate 1 may further include a protective layer provided on a main surface of the support film 11 opposite to the light transmissive resin layer 7B and the conductor portion 3. Providing the protective layer prevents the support film 11 from being scratched. The protective layer can be a layer similar to the intermediate resin layer 12. The thickness of the protective layer may be 5 nm or more, 50 nm or more, or 500 nm or more, and may be 10 μm or less, 5 μm or less, or 2 μm or less.

The conductor portion 3 constituting the electroconductive layer 5 includes a part having a pattern including the openings 3*a*. The pattern including the openings 3*a* includes a mesh-like pattern that is formed by a plurality of linear portions intersecting each other and includes the plurality of openings 3*a* regularly arranged. The conductor portion 3 having the mesh-like pattern functions as a radiation conductor and a feed line of an antenna 200 described later. The conductor portion 3 includes a solid planar pattern having no opening 3*a*. The conductor portion 3 having the planar pattern functions as a terminal pad portion and a ground pad portion described later. The configuration of the pattern of the conductor portion 3 in the electroconductive layer 5 will be detailed later.

The conductor portion 3 may contain metal. The conductor portion 3 may contain at least one metal selected from copper, nickel, cobalt, palladium, silver, gold, platinum, and tin, or may contain copper. The conductor portion 3 may be metal plating formed by a plating method. The conductor portion 3 may further contain a nonmetallic element such as phosphorus within a range in which appropriate conductivity is maintained.

The conductor portion 3 may be a laminate including a plurality of layers. In addition, the conductor portion 3 may have a blackened layer as a surface layer portion on a side opposite to the light transmissive substrate 1. The blackened layer can contribute to improvement in visibility of a display device in which the electroconductive film is incorporated.

The insulating resin portion 7A is formed of a light transmissive resin and is provided so as to fill the openings 3*a* of the conductor portion 3, and the insulating resin portion 7A and the conductor portion 3 usually form a flat surface.

The light transmissive resin layer 7B is formed of a light transmissive resin. The total light transmittance of the light transmissive resin layer 7B may be 90 to 100%. The light transmissive resin layer 7B may have a haze of 0 to 5%.

The difference between the light transmissive substrate 1 (or the refractive index of the support film constituting the light transmissive substrate 1) and the refractive index of the light transmissive resin layer 7B may be 0.1 or less. As a result, good visibility of a display image is more easily achieved. The refractive index (nd 25) of the light transmissive resin layer 7B may be, for example, 1.0 or more, and may be 1.7 or less, 1.6 or less, or 1.5 or less. The refractive index can be measured by a spectroscopic ellipsometer. In terms of uniformity of the optical path length, the conductor portion 3, the insulating resin portion 7A, and the light transmissive resin layer 7B may have substantially the same thickness.

The resin forming the insulating resin portion 7A and the light transmissive resin layer 7B may be a cured product of a curable resin composition (photocurable resin composition or thermosetting resin composition). The curable resin composition forming the insulating resin portion 7A and/or the light transmissive resin layer 7B includes a curable resin, and examples thereof include an acrylic resin, an amino resin, a cyanate resin, an isocyanate resin, a polyimide resin, an epoxy resin, an oxetane resin, a polyester, an allyl resin, a phenolic resin, a benzoxazine resin, a xylene resin, a ketone resin, a furan resin, a COPNA resin, a silicon resin, a dicyclopentadiene resin, a benzocyclobutene resin, an episulfide resin, a thiol-ene resin, a polyazomethine resin, a polyvinyl benzyl ether compound, acenaphthylene, and an ultraviolet curable resin containing a functional group that causes a polymerization reaction with ultraviolet rays such as an unsaturated double bond, a cyclic ether, and a vinyl ether.

The resin forming the insulating resin portion 7A and the resin forming the light transmissive resin layer 7B may be the same. Since the insulating resin portion 7A and the light transmissive resin layer 7B formed of the same resin have the same refractive index, the uniformity of the optical path length transmitted through the electroconductive film 20 can be further improved. In a case where the resin forming the insulating resin portion 7A and the resin forming the light transmissive resin layer 7B are the same, for example, the insulating resin portion 7A and the light transmissive resin layer 7B can be easily and collectively formed by forming a pattern from one curable resin layer by an imprinting method or the like.

The electroconductive film 20 can be manufactured, for example, by a method including pattern formation by the imprinting method. An example of a method for manufacturing the electroconductive film 20 includes: preparing the light transmissive substrate 1 including the support film, the intermediate resin layer, and the underlying layer containing the catalyst, the intermediate resin layer, and the underlying layer being provided on one main surface of the support film; forming the curable resin layer on the main surface 1S on the underlying layer side of the light transmissive substrate 1; forming a trench in which the underlying layer is exposed by an imprinting method using a mold having a convex portion; and forming the conductor portion 3 filling the trench by an electroless plating method in which metal plating is grown from the underlying layer. The curable resin layer is cured in a state where the mold is pushed into the curable resin layer to thereby form collectively the insulating resin portion 7A having a pattern including an opening with an inverted shape of the convex portion of the mold, and the light transmissive resin layer 7B. The method for forming the insulating resin portion 7A having the pattern including the opening is not limited to the imprinting method, and any method such as photolithography can be applied.

Figure 4:
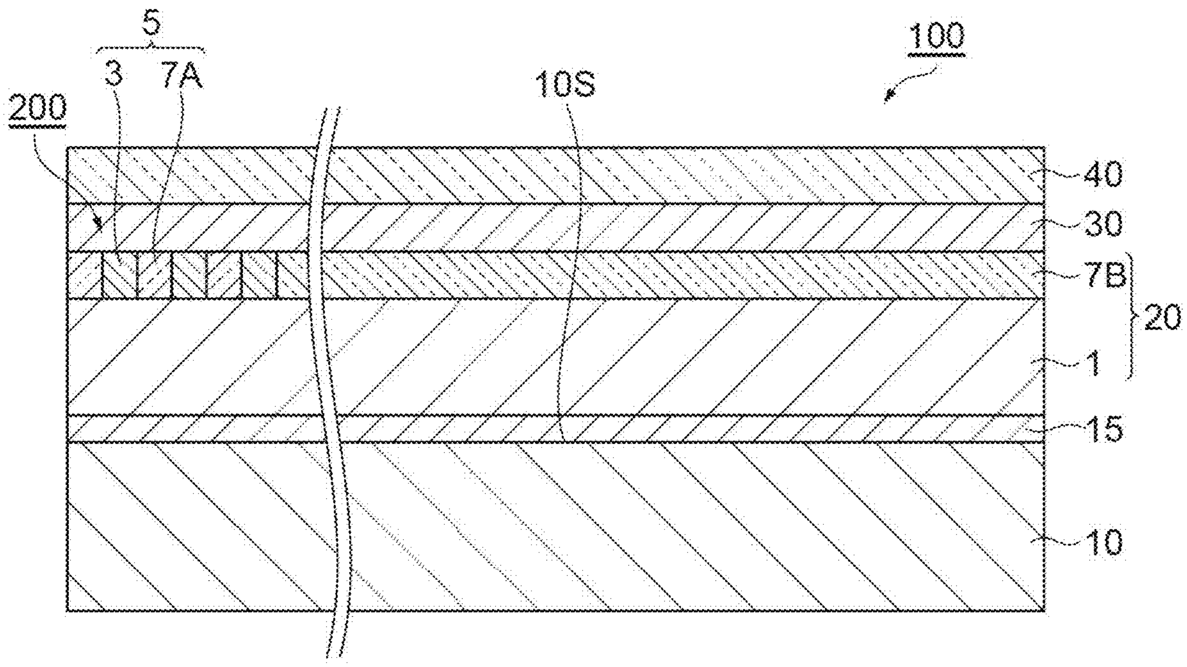
FIG. 4 is a cross-sectional view illustrating a display device according to an embodiment.

The electroconductive film described above as an example can be incorporated into a display device as the planar transparent antenna 200. The display device may be, for example, a liquid crystal display device or an organic EL display device. FIG. 4 is a cross-sectional view illustrating an embodiment of a display device in which an electroconductive film is incorporated. A display device 100 illustrated in FIG. 4 includes an image display unit 10 having an image display region 10S, a dielectric layer 15, an electroconductive film 20 (antenna 200), a polarizing plate 30, and a cover glass 40. Here, the image display unit 10 functions as a ground conductor for the antenna 200 of the electroconductive film 20. Thus, the planar transparent antenna 200 has a patch antenna configuration. The dielectric layer 15, the electroconductive film 20, the polarizing plate 30, and the cover glass 40 are laminated, in this order from the image display unit 10 side, on the image display region 10S side of the image display unit 10. The configuration of the display device is not limited to the form of FIG. 4, and can be appropriately changed as necessary. For example, the polarizing plate 30 may be provided between the image display unit 10 and the electroconductive film 20. The image display unit 10 may be, for example, a liquid crystal display unit. As the polarizing plate 30 and the cover glass 40, those commonly used in a display device can be used. The polarizing plate 30 and the cover glass 40 are not necessarily provided. Light for image display emitted from the image display region 10S of the image display unit 10 passes through a path having a highly uniform optical path length including the electroconductive film 20. This makes it possible to display an image with high uniformity and favorable quality with suppressed moire.

Figure 5:
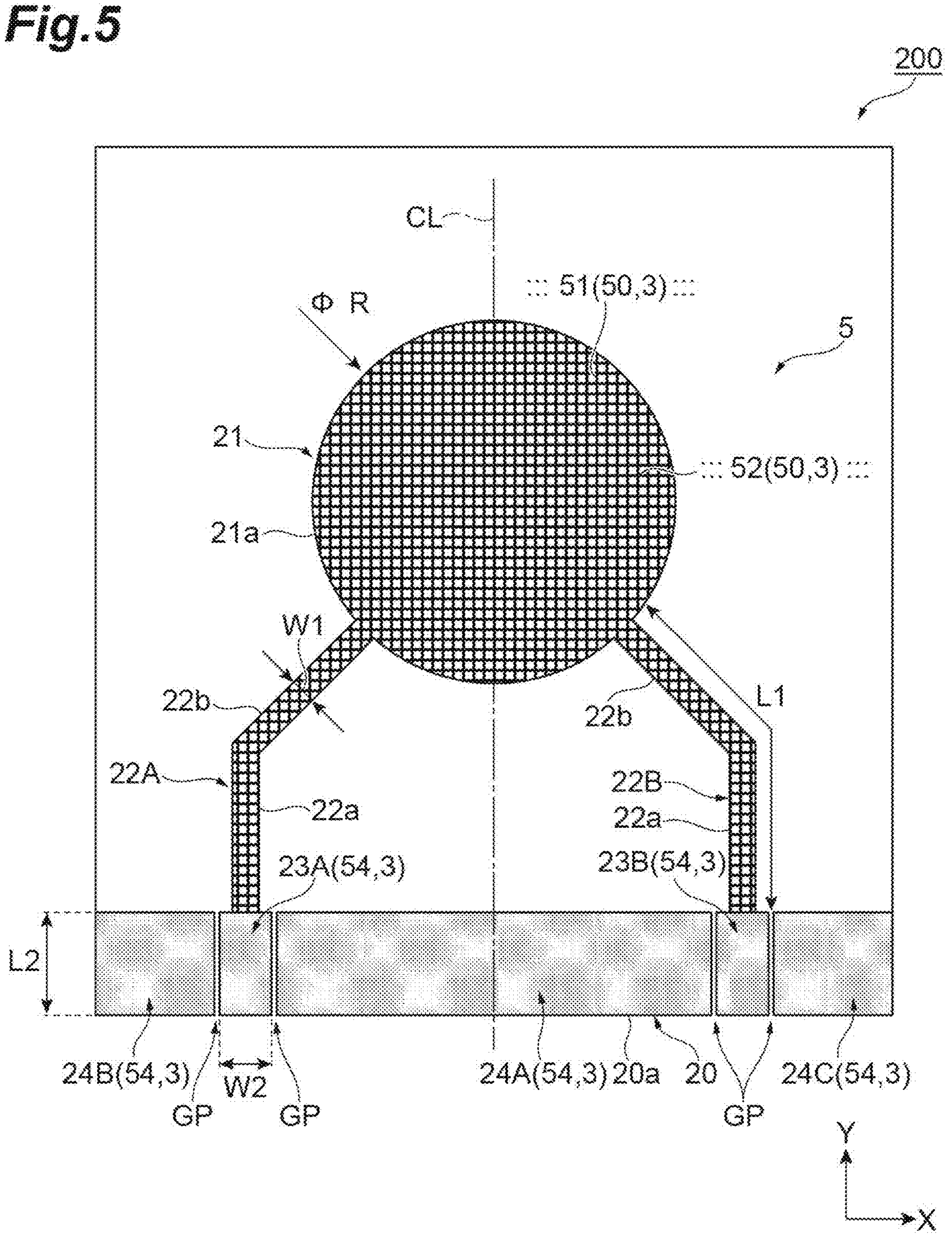
FIG. 5 is a plan view of an antenna.

Next, a configuration of the antenna 200 according to an embodiment of the present disclosure will be described in detail with reference to FIG. 5. The antenna 200 includes the electroconductive layer 5 described above. FIG. 5 is a plan view of the antenna 200. FIG. 5 is an enlarged view of a part of the antenna. In the following description, it is assumed that XY coordinates are set with respect to a plane parallel to the main surface 1S. The Y-axis direction is a direction along the main surface 1S, and corresponds to a direction orthogonal to a side portion of the electroconductive film 20 in the example illustrated in FIG. 1. The center side of the electroconductive film 20 is defined as a positive side in the Y-axis direction, and the outer peripheral side of the electroconductive film 20 is defined as a negative side in the Y-axis direction. The X-axis direction is a direction orthogonal to the Y-axis direction along the main surface 1S, and corresponds to a direction in which a side portion 20*a* of the electroconductive film 20 extends in the example illustrated in FIG. 1. One side in which the side portion 20*a* of the electroconductive film 20 extends is defined as a positive side in the X-axis direction, and the other side is defined as a negative side in the X-axis direction.

The electroconductive layer 5 of the antenna 200 includes a radiation conductor 21, feed lines 22A and 22B, terminal pad portions 23A and 23B (terminals), and ground pad portions 24A, 24B, and 24C. The antenna 200 has a linear symmetrical configuration with respect to a center line CL parallel to the Y-axis direction.

The radiation conductor 21 is a region that radiates a signal as an antenna. The radiation conductor 21 has a circular shape. The center of the radiation conductor 21 is disposed on the center line CL. The radiation conductor 21 is disposed at a position spaced apart from the side portion 20*a* of the electroconductive film 20 toward the positive side in the Y-axis direction. The radiation conductor 21 has a dimension of a diameter R.

The feed lines 22A and 22B are lines for feeding power to the radiation conductor 21. That is, the antenna 200 functions as a dual-polarized antenna. For example, a diagonally polarized signal in a direction in which an inclined portion 22*b* of the feed line 22A extends can be fed via the feed line 22A, and a diagonally polarized signal in a direction in which an inclined portion 22*b* of the feed line 22B extends can be fed via the feed line 22B. The feed lines 22A and 22B each have a vertical portion 22*a* extending perpendicular to the side portion 20*a* of the electroconductive film 20 and an inclined portion 22*b* inclined with respect to the Y-axis direction. The vertical portion 22*a* of the feed line 22A extends toward the positive side in the Y-axis direction from the terminal pad portion 23A formed on the side portion 20*a* side of the electroconductive film 20. The vertical portion 22*a* of the feed line 22A extends in parallel with the center line CL (that is, the Y-axis direction) at a position spaced apart from the center line CL toward the negative side in the X-axis direction.

The inclined portion 22*b* of the feed line 22A is inclined, from an end part of the vertical portion 22*a* on the positive side in the Y-axis direction, so as to approach the center line CL side (that is, the positive side in the X-axis direction) as the inclined portion 22*b* extends toward the positive side in the Y-axis direction. An end part of the inclined portion 22*b* on the positive side in the Y-axis direction is connected to an outer peripheral edge 21*a* of the radiation conductor 21. The feed line 22A has a constant width dimension W1 at the vertical portion 22*a* and the inclined portion 22*b*. In addition, the feed line 22A has a line length L1 that is the total dimension of the length dimension of the vertical portion 22*a* and the length dimension of the inclined portion 22*b*. Here, the width dimension W1 is a dimension in a direction orthogonal to the extending direction of the vertical portion 22*a* and the inclined portion 22*b* in the in-plane direction of the planar antenna 200, and the line length L1 is a dimension along the extending direction of the vertical portion 22*a* and the inclined portion 22*b* in the in-plane direction of the planar antenna 200.

Note that, in the example illustrated in FIG. 5, the vertical portion 22*a* of the feed line 22A is disposed at a position spaced apart from an end part of the radiation conductor 21 on the negative side in the X-axis direction toward the negative side in the X-axis direction. In addition, the end part of the vertical portion 22*a* of the feed line 22A on the positive side in the Y-axis direction (that is, the part connected to the inclined portion 22*b*) is disposed at a position spaced apart from an end part of the radiation conductor 21 on the negative side in the Y-axis direction toward the negative side in the Y-axis direction. However, the arrangement and shape of each of the vertical portion 22*a* and the inclined portion 22*b* are not particularly limited as long as they satisfy the impedance and dimensional relationship described later. The feed line 22B has a structure that is linearly symmetrical to the feed line 22A with respect to the center line CL. In the present embodiment, the inclined portion 22*b* of the feed line 22A and the inclined portion 22*b* of the feed line 22B are connected to the outer peripheral edge 21*a* of the radiation conductor 21 such that a virtual line obtained by extending the inclined portion 22*b* of the feed line 22A and a virtual line obtained by extending the inclined portion 22*b* of the feed line 22B are orthogonal to each other. In other words, the angle formed by the virtual line obtained by extending the inclined portion 22*b* of the feed line 22A and the virtual line obtained by extending the inclined portion 22*b* of the feed line 22B is 90 degrees.

The terminal pad portions 23A and 23B are terminals connected to the feed lines 22A and 22B, respectively. The terminal pad portions 23A and 23B are connected to an external input/output terminal to supply power to the radiation conductor 21 via the feed lines 22A and 22B. The terminal pad portions 23A and 23B are disposed near the side portion 20*a* of the electroconductive film 20. The terminal pad portions 23A and 23B extend from end parts of the vertical portions 22*a* of the feed lines 22A and 22B on the negative side in the Y-axis direction to the side portion 20*a* toward the negative side in the Y-axis direction. The terminal pad portions 23A and 23B each extend in the Y-axis direction with a constant width dimension W2. The terminal pad portions 23A and 23B each extend in the Y-axis direction with a length dimension L2. Here, the width dimension W2 is a dimension in a direction orthogonal to the extending direction of the terminal pad portions 23A and 23B in the in-plane direction of the planar antenna 200, and the length dimension L2 is a dimension along the extending direction of the terminal pad portions 23A and 23B in the in-plane direction of the planar antenna 200.

The ground pad portions 24A, 24B, and 24C are electrically grounded regions. The ground pad portions 24A, 24B, and 24C are connected to a ground terminal (not illustrated). The ground pad portions 24A, 24B, and 24C are arranged with a gap GP with respect to the terminal pad portions 23A and 23B to thereby be insulated from the terminal pad portions 23A and 23B. The ground pad portion 24A is formed to extend in the X-axis direction along the side portion 20*a* in a region between the terminal pad portions 23A and 23B. The ground pad portion 24B is formed to extend in the X-axis direction along the side portion 20*a* in a region on the negative side in the X-axis direction of the terminal pad portion 23A. The ground pad portion 24C is formed to extend in the X-axis direction along the side portion 20*a* in a region on the positive side in the X-axis direction of the terminal pad portion 23B. The ground pad portions 24A, 24B, and 24C have a constant width dimension in the Y-axis direction and extend in a band shape in the X-axis direction. The width dimension of each of the ground pad portions 24A, 24B, and 24C is the same as the length dimension L2 of each of the terminal pad portions 23A and 23B.

As described above, the terminal pad portion 23A, which is a signal line, has a structure surrounded by the ground pad portions 24A and 24B from both sides of the terminal pad portion 23A in the X-axis direction. The terminal pad portion 23B, which is a signal line, has a structure surrounded by the ground pad portions 24A and 24C from both sides of the terminal pad portion 23B in the X-axis direction. The terminal pad portions 23A and 23B are thus coplanar lines.

As illustrated in FIG. 5, the antenna 200 includes a mesh-like conductor pattern 50 as the conductor portion 3. Among the constituent elements of the antenna 200, the radiation conductor 21 and the feed lines 22A and 22B each have the mesh-like conductor pattern 50. The mesh-like conductor pattern 50 includes a first electroconductive line 51 and a plurality of second electroconductive lines 52. The first electroconductive line 51 is the linear conductor portion 3 extending parallel to the Y-axis direction. The plurality of first electroconductive lines 51 is arranged to be spaced apart from each other in the X-axis direction. The plurality of first electroconductive lines 51 is arranged to be spaced apart at a constant pitch. The second electroconductive line 52 is the linear conductor portion 3 extending parallel to the X-axis direction. The plurality of second electroconductive lines 52 is arranged to be spaced apart from each other in the Y-axis direction. The plurality of second electroconductive lines 52 is arranged to be spaced apart at a constant pitch. The thickness of the electroconductive lines 51 and 52 is not particularly limited, and may be set to, for example, 1 to 3 μm. The pitch of the electroconductive lines 51 and 52 is not particularly limited, and may be set to, for example, 100 to 300 μm. The first electroconductive line 51 does not need to be parallel to the Y-axis direction as long as the first electroconductive line 51 extends in the Y-axis direction, and the second electroconductive line 52 does not need to be parallel to the X-axis direction as long as the second electroconductive line 52 extends in the X-axis direction.

In the present embodiment, the radiation conductor 21 and the feed lines 22A and 22B have end electroconductive lines constituting the outer peripheral edges. The radiation conductor 21 has a circular shape formed by the end electroconductive line. Note that the radiation conductor 21 having a circular shape is not limited to have a strictly perfect circular shape, and includes variations caused by manufacturing errors and the like. In addition, the end electroconductive line constituting the outer peripheral edge of the radiation conductor 21 is not limited to a curved line only, and may partially include a straight line and a wavy line portion. Further, it is not always necessary that the radiation conductor 21 and the feed lines 22A and 22B include the end electroconductive lines. In this case, it is only required that the shape formed by connecting the ends of the first electroconductive lines 51 or the second electroconductive lines 52 included in the mesh-like conductor pattern 50 is a circular shape.

The antenna 200 includes, as the conductor portion 3, a planar conductor pattern 54 formed by solidly applying an electroconductive material. Among the constituent elements of the antenna 200, the terminal pad portions 23A and 23B and the ground pad portions 24A, 24B, and 24C each have the planar conductor pattern 54. The terminal pad portions 23A and 23B and the ground pad portions 24A, 24B, and 24C each may have the mesh-like conductor pattern 50 instead of the solid planar conductor pattern 54, similarly to the radiation conductor 21 and the feed lines 22A and 22B.

Next, dimensions of the constituent elements of the antenna 200 will be described. At a predetermined frequency, the wavelength of the electromagnetic wave in the feed lines 22A and 22B is set to "λ". The wavelength is the wavelength of the electromagnetic wave propagating through the dielectric (the light transmissive substrate 1 and the dielectric layer 15 in FIG. 4) between the electroconductive layer 5 and the ground conductor (the image display unit 10 in FIG. 4). The frequency of the antenna 200 is not particularly limited, but may be set to 24.25 to 29.5 GHz. In the present embodiment, a description will be given using an example in which the frequency is set to 27.5 GHZ.

The diameter R of the radiation conductor 21 is substantially equal to a half of the wavelength λ, that is, a value of ½ of the wavelength λ. The line length L1 of the feed lines 22A and 22B may be longer than the radius (½ of the diameter R) of the radiation conductor 21. That is, the line length L1 of the feed lines 22A and 22B may be longer than ¼ of the wavelength λ of the electromagnetic wave in the feed lines 22A and 22B. The line length L1 of the feed lines 22A and 22B may be equal to or less than the diameter of the radiation conductor 21. That is, the line length L1 of the feed lines 22A and 22B may be ½ or less of the wavelength λ of the electromagnetic wave in the feed lines 22A and 22B. Although not particularly limited, the diameter R of the radiation conductor 21 may be set to 3 to 3.5 mm. It is only required that the line length L1 of the feed lines 22A and 22B is in a range satisfying the above relationship with respect to the diameter R. In the present embodiment, the line length L1 of the feed lines 22A and 22B is the same as the diameter of the radiation conductor 21.

The width dimension W1 of the feed lines 22A and 22B is determined depending on the value of the characteristic impedance, is a value between the characteristic impedance at the end part of the radiation conductor 21 and the characteristic impedance of the terminal pad portions 23A and 23B, and may be set to 0.1 to 0.3 mm. The width dimension W2 of the terminal pad portions 23A and 23B may be larger than the width of the feed lines 22A and 22B, and may be set to 0.3 to 0.5 mm. The length dimension L2 of the terminal pad portions 23A and 23B may be set to 0.5 to 1.5 mm.

Next, the impedance of the transmission line (the feed lines 22A and 22B and the terminal pad portions 23A and 23B) in the antenna 200 will be described. The impedance of the feed lines 22A and 22B is greater than the impedance of feed points of the terminal pad portions 23A and 23B. The feed points of the terminal pad portions 23A and 23B are points connected to an external input/output terminal. Specifically, since the external input/output terminal is connected to the entire terminal pad portions 23A and 23B, the entire terminal pad portions 23A and 23B function as the feed points.

Figure 6:
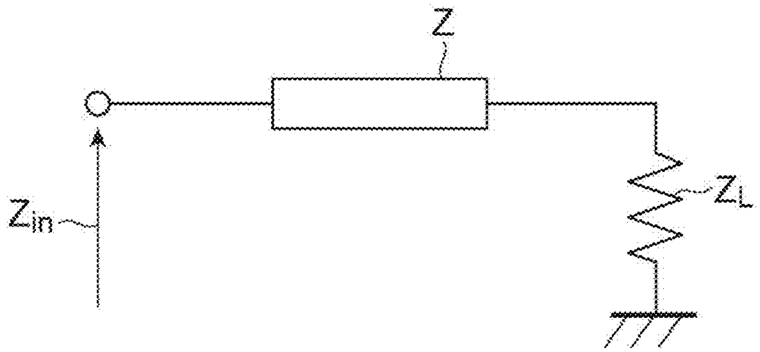
FIG. 6 is a diagram for explanation of impedance.

Here, the characteristic impedance defined for the feed lines 22A and 22B and the terminal pad portions 23A and 23B is adopted as the impedance of the transmission line in the antenna 200. The characteristic impedance is represented as a ratio of a voltage and a current generated on a certain transmission line in a case where an electric signal is transmitted by using a uniform transmission line (the type and structure of the medium in the transmission line are constant). The characteristic impedance is defined by formula (1). "R[Ω/m]" is series resistance per unit length. "L[H/m]" is series inductance per unit length. "G[s/m]" is shunt conductance per unit length. "C[F/m]" is shunt capacitance per unit length. "j" is an imaginary unit and "ω" is an angular frequency of the alternating current. In the model of a circuit as illustrated in FIG. 6, when characteristic impedance Z of the transmission line, load impedance $Z_L$ at the end of the transmission line, and input impedance $Z_{in}$ at the end of the transmission line match, signal reflection does not occur. This state is referred to as impedance matching. As the characteristic impedance, a value in the state of impedance matching is used.

[Math. 1]

$$Z_0 = \sqrt{\frac{R + j\omega L}{G + j\omega C}} \tag{1}$$

A method of measuring the characteristic impedance will be described. First, the input impedance when short-circuited at the position of the load impedance $Z_L$ at the end of the transmission line is measured. For the measurement, an LCR meter or a network analyzer is used. The input impedance is referred to as "Zshort". Further, the input impedance when opened at the position of the load impedance $Z_L$ at the end of the transmission line is measured. For the measurement, an LCR meter or a network analyzer is used. The input impedance is referred to as "Zopen". In a case where these measured values are used, the characteristic impedance of the transmission line is obtained by the following formula (2).

[Math. 2]

$$Z = \sqrt{Z_{open} Z_{short}} \tag{2}$$

In the feed lines 22A and 22B, the position of the load impedance $Z_L$ at the end of the transmission line and the position of the input impedance at the end of the transmission line are the positions of connection points of the radiation conductor 21 to the terminal pad portion 23A or the terminal pad portion 23B. In addition, short-circuiting at the position of the load impedance $Z_L$ at the end of the transmission line means that the feed lines 22A and 22B are connected to the ground. In addition, opening at the position of the load impedance $Z_L$ at the end of the transmission line means that the feed lines 22A and 22B are disconnected from the other structures and leave the feed lines 22A and 22B not connected to the conductor.

In the terminal pad portions 23A and 23B, the position of the load impedance $Z_L$ at the end of the transmission line and the position of the input impedance at the end of the transmission line are the positions of connection points of the radiation conductor 21 to the terminal pad portion 23A or the terminal pad portion 23B. In addition, short-circuiting at the position of the load impedance $Z_L$ at the end of the transmission line means that the terminal pad portions 23A and 23B are connected to the ground. In addition, opening at the position of the load impedance $Z_L$ at the end of the transmission line means that the terminal pad portions 23A and 23B are disconnected from the other structures and leave the terminal pad portions 23A and 23B not connected to the conductor.

Next, functions and effects of the antenna 200 and the display device 100 according to the present embodiment will be described.

According to the antenna 200, power is fed from the terminal pad portions 23A and 23B (terminals) to the radiation conductor 21 via the feed lines 22A and 22B. Thus, the terminal pad portions 23A and 23B and the feed lines 22A and 22B function as the transmission lines. In such a configuration, the impedance of the feed lines 22A and 22B is greater than the impedance of the feed points of the terminal pad portions 23A and 23B. The line length of the feed lines 22A and 22B is longer than the radius of the radiation conductor 21. According to such a configuration, good return loss characteristics can be obtained in a wide band.

The line length of the feed lines 22A and 22B may be equal to or less than the diameter of the radiation conductor 21. In this case, it is possible to prevent an increase in size of the antenna 200 due to the excessively long feed lines 22A and 22B while good return loss characteristics are achieved in a wide band.

The terminal pad portions 23A and 23B may be coplanar lines. In this case, it is possible to easily connect a cable or the like, which is an external input/output terminal, with the electrical characteristics maintained.

The width of the terminal pad portions 23A and 23B may be greater than the width of the feed lines 22A and 22B. In this case, the connectivity between the external input/output terminal and the terminal pad portions 23A and 23B can be enhanced while good return loss characteristics are achieved in a wide band.

The radiation conductor 21 and the feed lines 22A and 22B each may have the mesh-like conductor pattern 50. In this case, high transparency can be achieved while conductivity is exhibited in the radiation conductor 21 and the feed lines 22A and 22B. Further, the conductor patterns 50 in the radiation conductor 21 and the feed lines 22A and 22B can be easily and collectively formed with high accuracy.

The display device 100 according to an aspect of the present disclosure includes the antenna 200 described above.

According to the display device 100, functions and effects similar to those of the above-described antenna 200 can be obtained.

The present disclosure is not limited to the above-described embodiment.

Figure 7:
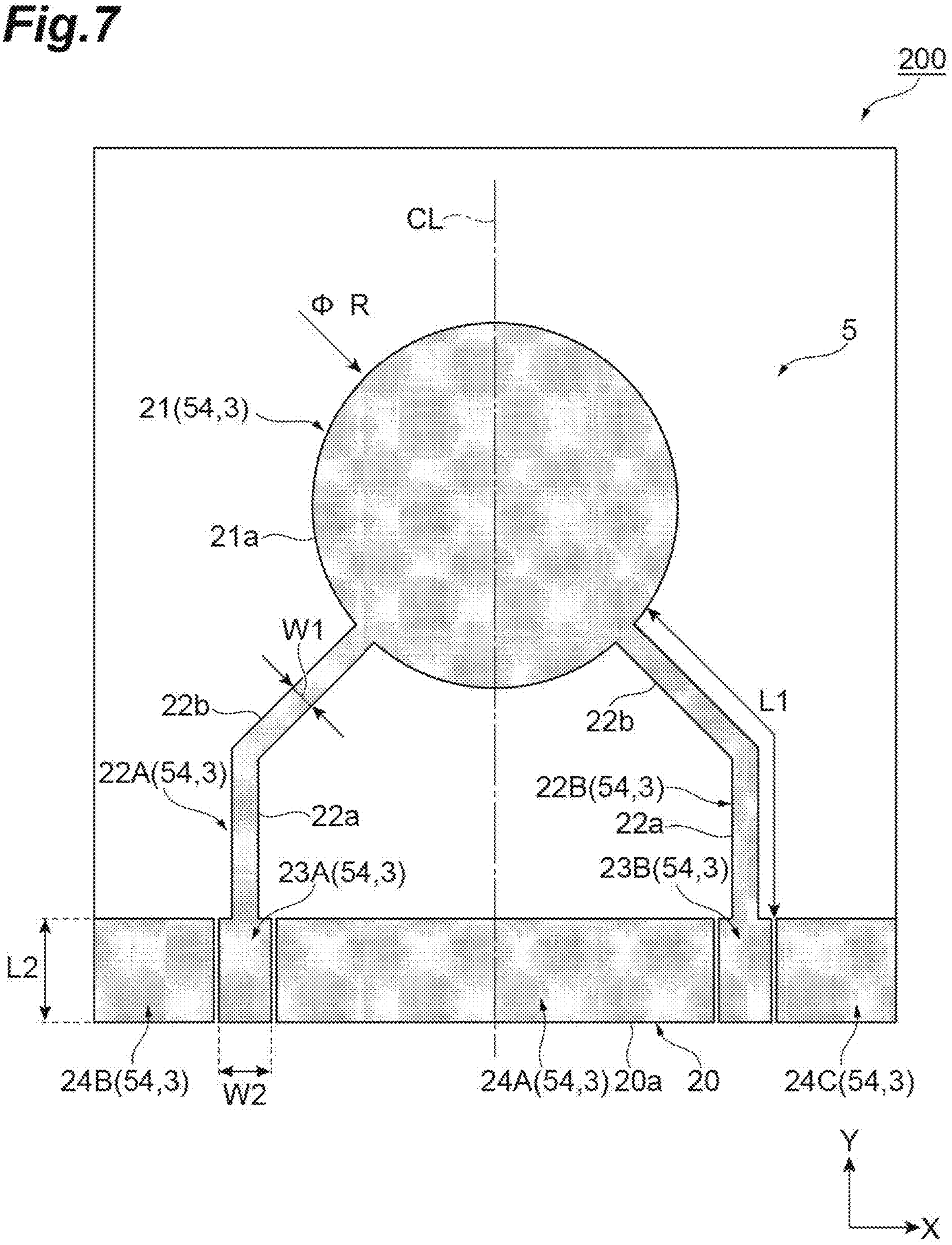
FIG. 7 is a plan view of an antenna according to a modification.

For example, the antenna 200 illustrated in FIG. 7 may be adopted. The antenna 200 illustrated in FIG. 7 employs the radiation conductor 21 and the feed lines 22A and 22B having the solid planar conductor pattern 54 applied all over, instead of the mesh-like radiation conductor 21 and feed lines 22A and 22B illustrated in FIG. 5. The other configurations of the antenna 200 illustrated in FIG. 7 are similar to those of the antenna 200 illustrated in FIG. 5.

Figure 8:
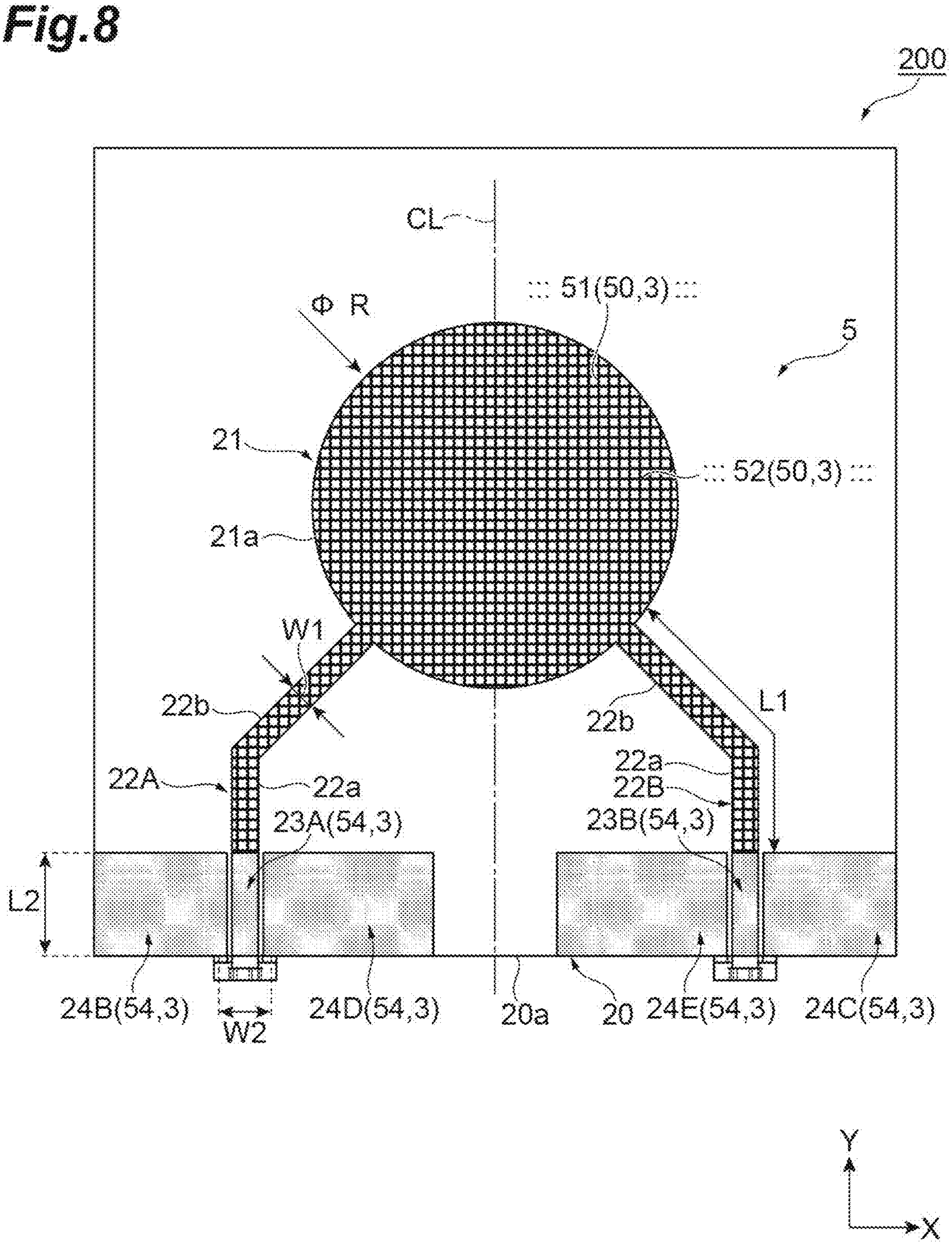
FIG. 8 is a plan view of an antenna according to a modification.

For example, the antenna 200 illustrated in FIG. 8 may be adopted. The antenna 200 illustrated in FIG. 8 employs the terminal pad portions 23A and 23B having the same width as that of the feed lines 22A and 22B, instead of the terminal pad portions 23A and 23B having a greater width than that of the feed lines 22A and 22B as illustrated in FIG. 5. The length of the vertical portions 22*a* of the feed lines 22A and 22B is shorter than that illustrated in FIG. 5. The ground pad portion 24A illustrated in FIG. 5 is divided at the center position in FIG. 8, forming ground pad portions 24D and 24E. In FIG. 8, the diameter of the radiation conductor 21 is smaller than a value of ½ of the wavelength λ, and the line length L1 of the feed lines 22A and 22B is smaller than ½ of the wavelength λ of the electromagnetic wave in the feed lines 22A and 22B. The other configurations of the antenna 200 illustrated in FIG. 8 are similar to those of the antenna 200 illustrated in FIG. 5.

Figure 9:
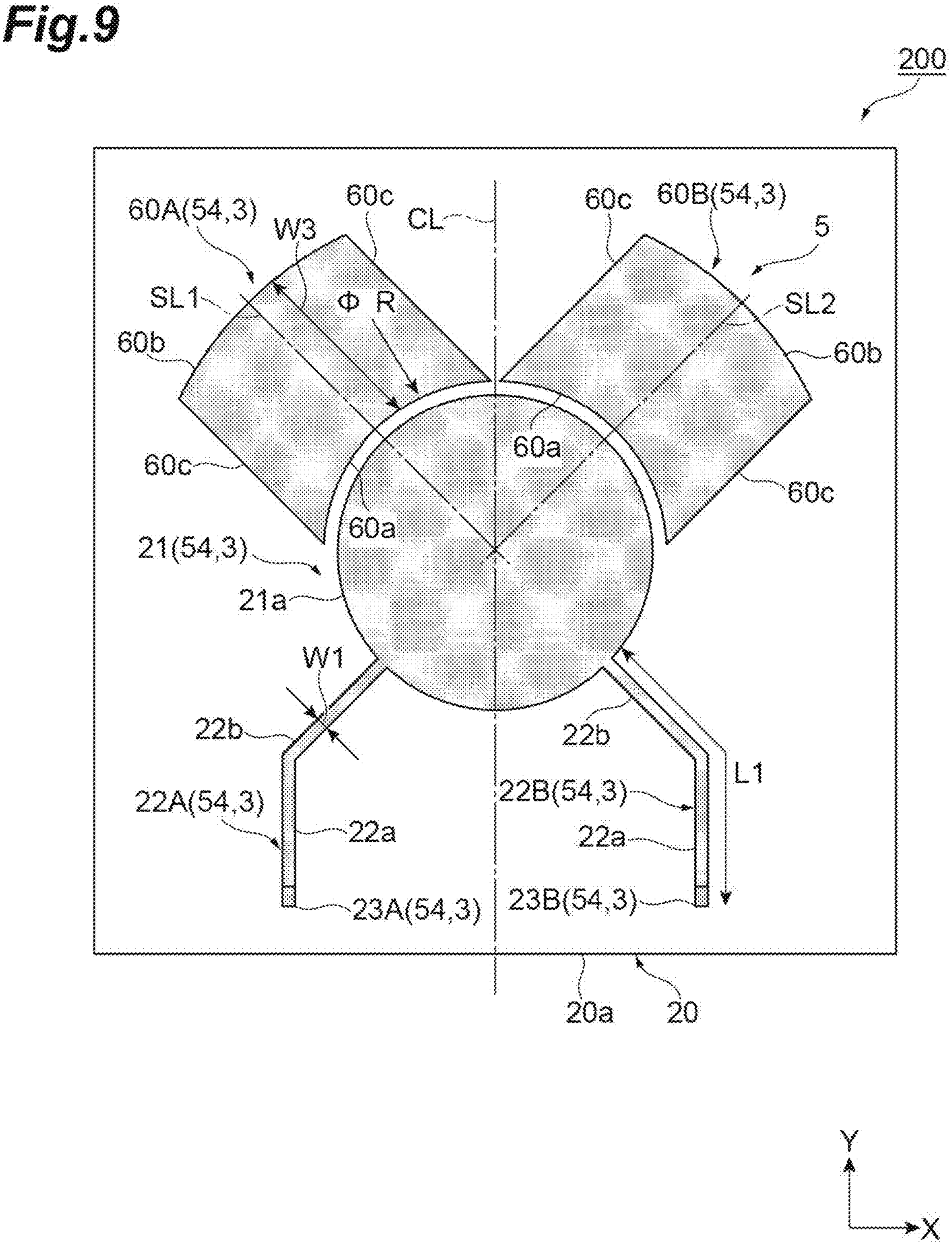
FIG. 9 is a plan view of an antenna according to a modification.

For example, the antenna 200 illustrated in FIG. 9 may be adopted. The antenna 200 illustrated in FIG. 9 employs the feed lines 22A and 22B having a narrow width dimension W1, instead of the feed lines 22A and 22B illustrated in FIG. 7. Further, the antenna 200 illustrated in FIG. 9 employs the terminal pad portions 23A and 23B that are short and have the same width as that of the feed lines 22A and 22B, instead of the terminal pad portions 23A and 23B illustrated in FIG. 7. Further, the antenna 200 illustrated in FIG. 9 does not include the ground pad portions 24A, 24B, and 24C. The antenna 200 illustrated in FIG. 9 includes peripheral conductors 60A and 60B. The peripheral conductors 60A and 60B are so-called "parasitic elements". Although the peripheral conductors 60A and 60B are not directly connected to the feed lines 22A and 22B, a high-frequency current flows through the radiation conductor 21, so that a high-frequency current also flows through the peripheral conductors 60A and 60B. In FIG. 9, the diameter of the radiation conductor 21 is smaller than a value of ½ of the wavelength λ, and the line length L1 of the feed lines 22A and 22B is smaller than ½ of the wavelength λ of the electromagnetic wave in the feed lines 22A and 22B. Further, in FIG. 9, the line length L1 of the feed lines 22A and 22B is smaller than the diameter of the radiation conductor 21. The other configurations of the antenna 200 illustrated in FIG. 9 are similar to those of the antenna 200 illustrated in FIG. 7.

The peripheral conductors 60A and 60B are conductors that are formed so as to extend in the radial direction and the circumferential direction of the radiation conductor 21 around the radiation conductor 21 and are spaced away from the radiation conductor 21. The peripheral conductors 60A and 60B are provided around a part of the radiation conductor 21 on the positive side in the Y-axis direction. The peripheral conductor 60A is provided with respect to a reference line SL1 obtained by inclining the center line CL by 45° toward the negative side in the X-axis direction. The peripheral conductor 60B is provided with respect to a reference line SL2 obtained by inclining the center line CL by 45° toward the positive side in the X-axis direction. The peripheral conductor 60A is provided around a part of the radiation conductor 21 on the negative side in the X-axis direction with respect to the center line CL. The peripheral conductor 60B is provided around a part of the radiation conductor 21 on the positive side in the X-axis direction with respect to the center line CL.

The peripheral conductors 60A and 60B each have an inner peripheral edge 60*a* on an inner side in the radial direction, an outer peripheral edge 60*b* on an outer side in the radial direction, and a pair of lateral edges 60*c* on both ends in the circumferential direction. The pair of lateral edges 60*c* of the peripheral conductor 60A is parallel to the reference line SL1 and disposed at positions spaced apart from each other. The pair of lateral edges 60*c* of the peripheral conductor 60B is parallel to the reference line SL2 and disposed at positions spaced apart from each other.

The inner peripheral edges 60*a* of the peripheral conductors 60A and 60B are disposed at positions spaced apart radially outward so as to form a slight gap between the inner peripheral edges 60*a* and the outer peripheral edge 21*a* of the radiation conductor 21. The outer peripheral edges 60*b* of the peripheral conductors 60A and 60B are disposed at positions spaced apart radially outward from the inner peripheral edges 60*a*. A width dimension W3 of each of the peripheral conductors 60A and 60B in the radial direction may be larger than the radius of the radiation conductor 21. Specifically, the width dimension W3 may be set to 1.5 to 2 mm.

The inner peripheral edges 60*a* of the peripheral conductors 60A and 60B each have an arc shape along the outer peripheral edge 21*a* of the radiation conductor 21. The outer peripheral edges 60*b* of the peripheral conductors 60A and 60B each also have an arc shape. The radius of curvature of the outer peripheral edge 60*b* of each of the peripheral conductors 60A and 60B is larger than the radius of curvature of the inner peripheral edge 60*a* of each of the peripheral conductors 60A and 60B. In the present embodiment, the radius of curvature of the inner peripheral edge 60*a* of each of the peripheral conductors 60A and 60B is a distance from the inner peripheral edge 60*a* to the center of the radiation conductor 21. The radius of curvature of the outer peripheral edge 60*b* of each of the peripheral conductors 60A and 60B is a distance from the outer peripheral edge 60*b* to the center of the radiation conductor 21.

The length of the inner peripheral edge 60*a* of each of the peripheral conductors 60A and 60B on the inner side in the radial direction is less than ¼ of the length of the outer peripheral edge 21*a* of the radiation conductor 21. In the present embodiment, the peripheral conductor 60A is provided at a position facing the connection part of the feed line 22B of the radiation conductor 21 with the radiation conductor 21 interposed therebetween. The inner peripheral edge 60*a* of the peripheral conductor 60A is provided, at the position, in a range facing a region of approximately ¼ of the length of the outer peripheral edge 21*a* of the radiation conductor 21. The peripheral conductor 60B is provided at a position facing the connection part of the feed line 22A of the radiation conductor 21 with the radiation conductor 21 interposed therebetween. The inner peripheral edge 60*a* of the peripheral conductor 60B is provided, at the position, in a range facing a region of approximately ¼ of the length of the outer peripheral edge 21*a* of the radiation conductor 21.

The antenna 200 illustrated in FIG. 9 may further include the peripheral conductors 60A and 60B that are formed so as to extend in the radial direction and the circumferential direction of the radiation conductor 21 around the radiation conductor 21 and are spaced away from the radiation conductor 21. In this case, better return loss characteristics can be obtained.

The width of each of the peripheral conductors 60A and 60B in the radial direction may be greater than the radius of the radiation conductor 21. In this case, the areas of the peripheral conductors 60A and 60B can be sufficiently increased, and good return loss characteristics can be obtained in a wider band.

The inner peripheral edges 60*a* of the peripheral conductors 60A and 60B on the inner side in the radial direction each may have a shape along the outer peripheral edge 21*a* of the radiation conductor 21. In this case, the peripheral conductors 60A and 60B can be disposed at positions close to the radiation conductor 21, which enhances the coupling between the radiation conductor 21 and the peripheral conductors 60A and 60B, so that good return loss characteristics can be achieved in a wider band.

The radius of curvature of the outer peripheral edge 60*b* of each of the peripheral conductors 60A and 60B on the outer side in the radial direction may be larger than the radius of curvature of the inner peripheral edge 60*a* of each of the peripheral conductors 60A and 60B on the inner side in the radial direction. In this case, the difference between the lengths of the peripheral conductors 60A and 60B at the reference lines SL1 and SL2 and the lengths of the peripheral conductors 60A and 60B at the pair of lateral edges 60*c* on both ends in the circumferential direction increases, so that good return loss characteristics can be achieved in a wider band.

The length of the inner peripheral edge 60*a* of each of the peripheral conductors 60A and 60B on the inner side in the radial direction may be less than ¼ of the length of the outer peripheral edge 21*a* of the radiation conductor 21. In this case, the peripheral conductors 60A and 60B having appropriate sizes can be disposed at appropriate positions. Specifically, the peripheral conductors 60A and 60B can be disposed symmetrically with respect to the polarization direction to thereby prevent the disturbance of the directivity.

In addition, the shapes and sizes of the feed lines 22A and 22B and the terminal pad portions 23A and 23B may be appropriately changed from those of the antenna 200 illustrated in FIGS. 5 and 7 to 9 described above without departing from the gist of the present disclosure.

EXAMPLES

Among the above-described embodiments, the antenna illustrated in FIG. 5 was prepared as Example 1. The diameter R of the radiation conductor 21 of the antenna in Example 1 is 3.5 mm. The diameter R is approximately equal to ½ (27.5 GHZ) of the wavelength λ. The feed lines 22A and 22B of the antenna in Example 1 each have a line length L1 of 3.5 mm and a width dimension W1 of 0.2 mm. The characteristic impedance Z of each of the feed lines 22A and 22B is about 100 ohm. The characteristic impedance Z of each of the terminal pad portions 23A and 23B is about 50 ohm. The electroconductive lines 51 and 51 of the mesh-like conductor pattern 50 each have a thickness of 1 μm and a pitch of 100 μm. Among the above-described embodiments, the antenna illustrated in FIG. 7 was prepared as Example 2. The antenna of Example 2 has the same dimensions and impedance as those of Example 1.

Among the above-described embodiments, the antenna illustrated in FIG. 9 was prepared as Example 3. The diameter R of the radiation conductor 21 of the antenna in Example 3 is 3 mm. The feed lines 22A and 22B of the antenna in Example 3 each have a line length L1 of 2.7 mm and a width dimension W1 of 0.1 mm. The characteristic impedance Z of each of the feed lines 22A and 22B is about 100 ohm. The characteristic impedance Z of each of the terminal pad portions 23A and 23B is about 50 ohm. The width dimension W3 of each of the peripheral conductors 60A and 60B is 1.7 mm.

Figure 10:
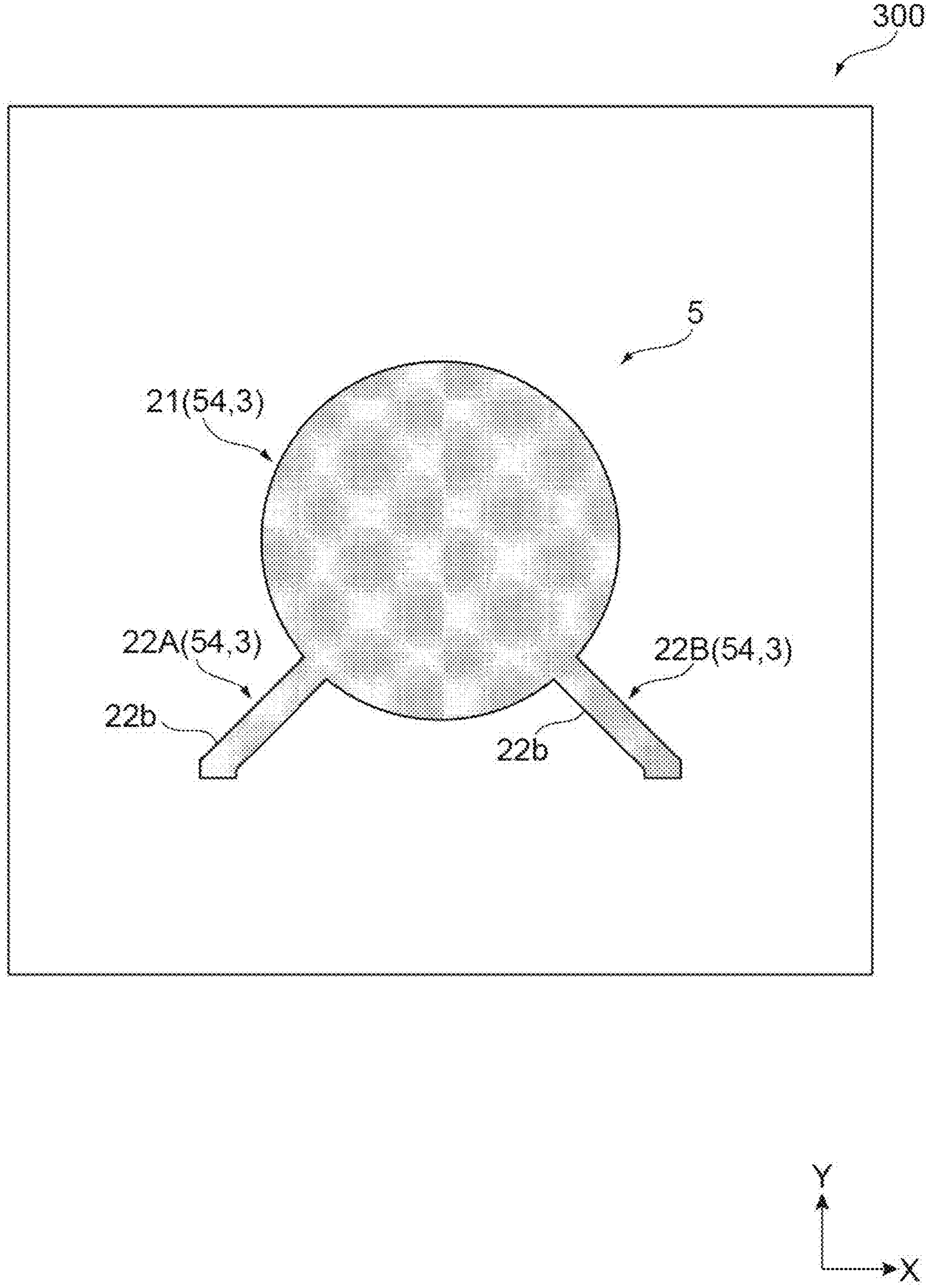
FIG. 10 is a plan view of an antenna according to a comparative example.

As a comparative example, an antenna 300 as illustrated in FIG. 10 was prepared. The diameter R of the radiation conductor 21 of the antenna 300 according to the comparative example is 3.2 mm. The feed lines 22A and 22B of the antenna in the comparative example each have a line length L1 of 1.5 mm and a width dimension W1 of 0.3 mm. The line length L1 is therefore shorter than the radius of the radiation conductor 21. The characteristic impedance Z of each of the feed lines 22A and 22B is about 100 ohm. The characteristic impedance Z of each of the terminal pad portions 23A and 23B is about 50 ohm.

Figure 11:
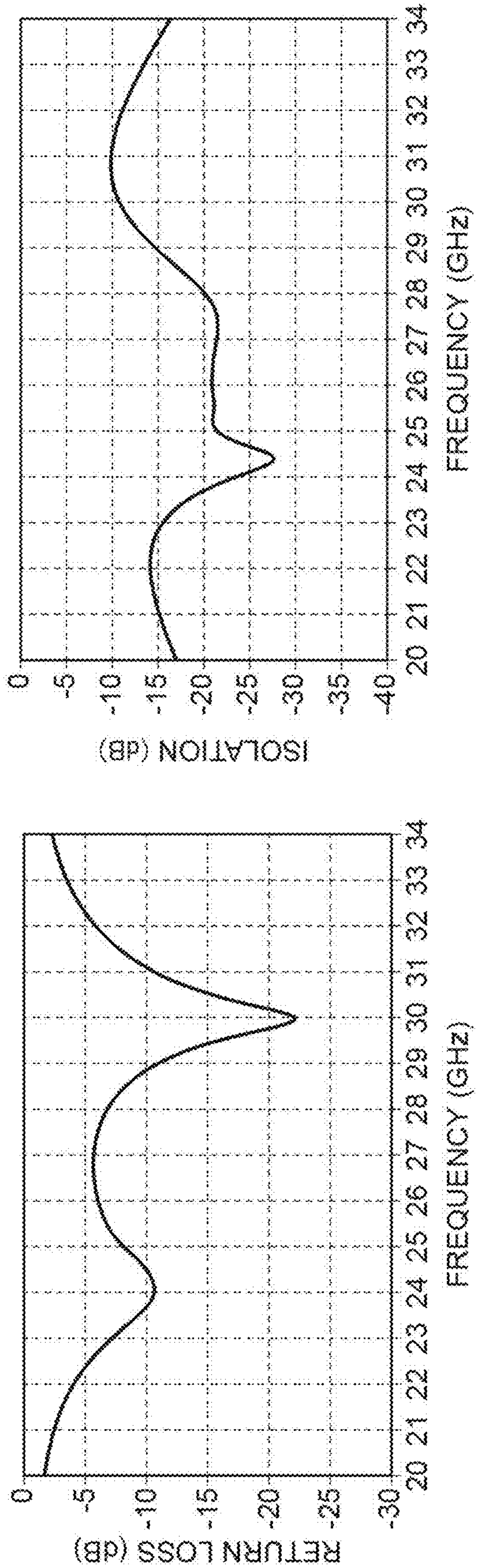
FIG. 11 is a graph showing simulation results of Example 1.
Figure 12:
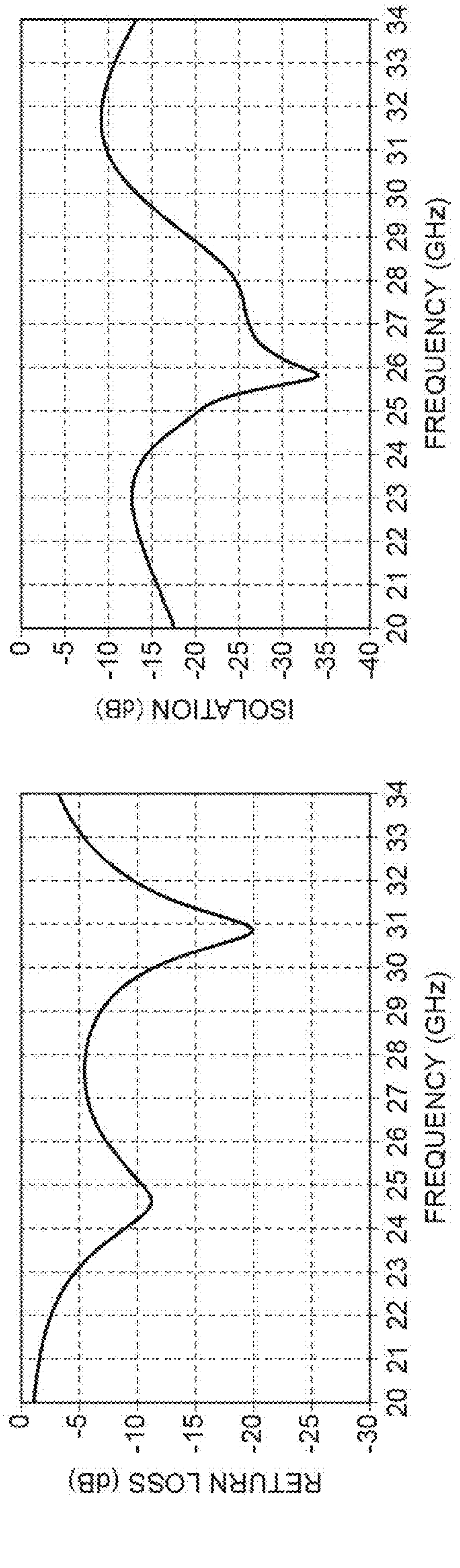
FIG. 12 is a graph showing simulation results of Example 2.
Figure 13:
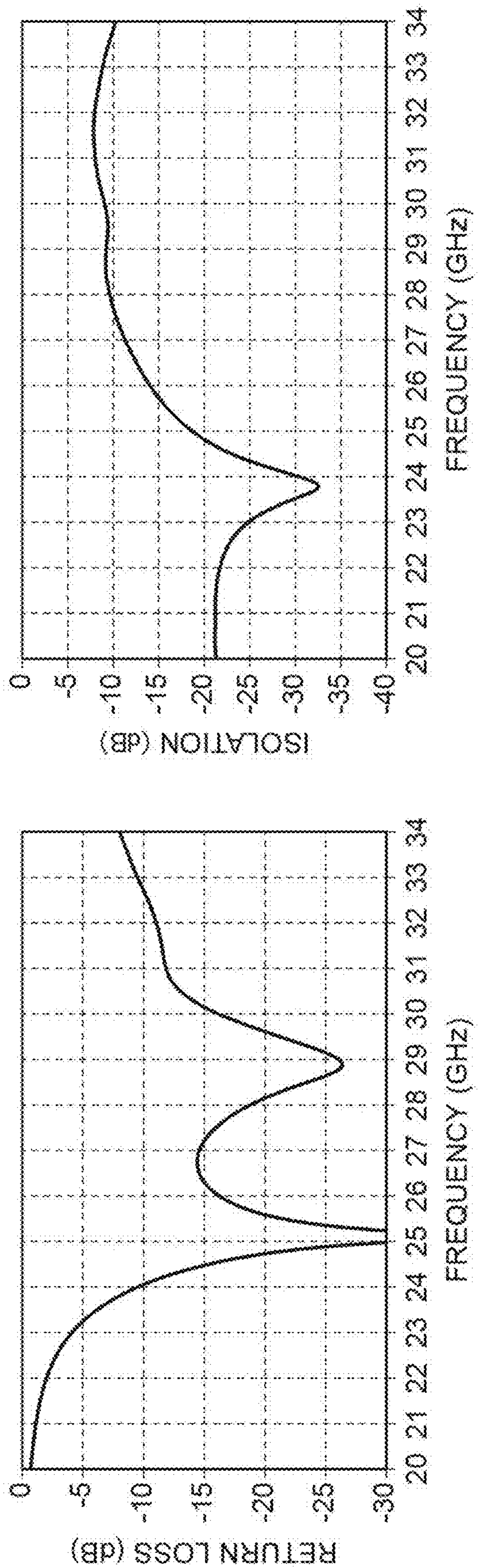
FIG. 13 is a graph showing simulation results of Example 3.
Figure 14:
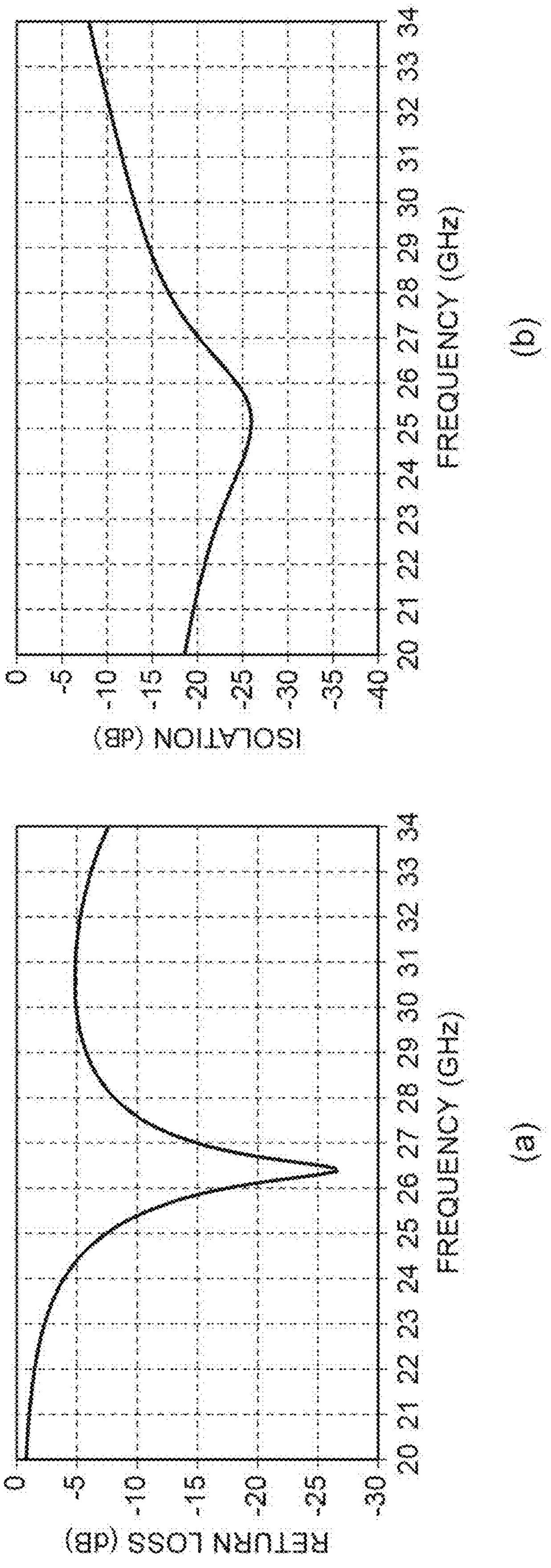
FIG. 14 is a graph showing simulation results of a comparative example.

As for the examples and comparative example, the return loss and isolation were evaluated by simulation. For the simulation, electromagnetic field analysis software HFSS (ANSYS, Inc.) was used. Simulation results of Examples 1 to 3 are illustrated in FIGS. 11 to 13, and simulation results of the comparative example are illustrated in FIG. 14. In the graphs of FIGS. 11 to 14 (*a*), the vertical axis represents a value (dB) of the return loss, and the horizontal axis represents a frequency. In the graphs of FIGS. 11 to 14 (*b*), the vertical axis represents a value (dB) of the isolation, and the horizontal axis represents a frequency.

As illustrated in FIGS. 11 to 14 (*a*), in Examples 1 to 3, good return loss characteristics are obtained in a wide band as compared with the comparative example. In particular, in Example 3 having the peripheral conductors, the return loss is further improved as compared with Examples 1 and 2. On the other hand, as illustrated in FIGS. 11 to 14 (*b*), in Examples 1 to 3, the insulation is not deteriorated as compared with the comparative example while good return loss characteristics are obtained in a wide band.

The technique according to the present disclosure includes the following configuration examples, yet is not limited thereto.

An antenna according to an aspect of the present disclosure includes a radiation conductor having a circular shape, a feed line configured to feed power to the radiation conductor, and a terminal connected to the feed line, in which impedance of the feed line is greater than impedance of a feed point of the terminal, and a line length of the feed line is longer than a radius of the radiation conductor.

According to the antenna, power is fed from the terminals to the radiation conductor via the feed lines. Therefore, the terminals and the feed lines function as the transmission lines. In such a configuration, the impedance of the feed lines is greater than the impedance of the feed points of the terminals. The line length of the feed lines is longer than the radius of the radiation conductor. According to such a configuration, good return loss characteristics can be obtained in a wide band.

The line length of the feed lines may be equal to or less than the diameter of the radiation conductor. In this case, it is possible to prevent an increase in size of the antenna due to the excessively long feed lines while good return loss characteristics are achieved in a wide band.

The terminals may be coplanar lines. In this case, it is possible to easily connect a cable or the like, which is an external input/output terminal, with the electrical characteristics maintained.

The width of the terminals may be greater than the width of the feed lines. In this case, the connectivity between the external input/output terminal and the terminal pad portions can be enhanced while good return loss characteristics are achieved in a wide band.

Around the radiation conductor, it is possible to further include peripheral conductors that are spaced away from the radiation conductor so as to extend in the radial direction and the circumferential direction of the radiation conductor. In this case, better return loss characteristics can be obtained.

The width of each of the peripheral conductors in the radial direction may be greater than the radius of the radiation conductor. In this case, the areas of the peripheral conductors can be sufficiently increased, and good return loss characteristics can be obtained in a wider band.

The inner peripheral edges of the peripheral conductors on the inner side in the radial direction each may have a shape along the outer peripheral edge of the radiation conductor. In this case, the peripheral conductors can be disposed at positions close to the radiation conductor, which enhances the coupling between the radiation conductor and the peripheral conductors, so that good return loss characteristics can be achieved in a wider band.

The radius of curvature of the outer peripheral edge of each of the peripheral conductors on the outer side in the radial direction may be larger than the radius of curvature of the inner peripheral edge of each of the peripheral conductors on the inner side in the radial direction. In this case, the difference between the lengths of the peripheral conductors at the reference lines and the lengths of the peripheral conductors at the pair of lateral edges on both ends in the circumferential direction increases, so that good return loss characteristics can be achieved in a wider band.

The length of the inner peripheral edge of each of the peripheral conductors on the inner side in the radial direction may be less than ¼ of the length of the outer peripheral edge of the radiation conductor. In this case, the peripheral conductors having appropriate sizes can be disposed at appropriate positions. Specifically, the peripheral conductors can be disposed symmetrically with respect to the polarization direction to thereby prevent the disturbance of the directivity.

The radiation conductors and the feed lines each may have the mesh-like conductor pattern. In this case, high transparency can be achieved while conductivity is exhibited in the radiation conductor and the feed lines. Further, the conductor patterns in the radiation conductor and the feed lines can be easily and collectively formed with high accuracy.

A display device according to an aspect of the present disclosure includes the antenna described above.

According to the display device, functions and effects similar to those of the above-described antenna can be obtained.

Embodiment 1

An antenna including:

a radiation conductor having a circular shape;

a feed line configured to feed power to the radiation conductor; and a terminal connected to the feed line, in which impedance of the feed line is greater than impedance of a feed point of the terminal, and a line length of the feed line is longer than a radius of the radiation conductor.

Embodiment 2

The antenna according to embodiment 1, in which the line length of the feed line is equal to or less than a diameter of the radiation conductor.

Embodiment 3

The antenna according to embodiment 1 or 2, in which the terminal is a coplanar line.

Embodiment 4

The antenna according to any one of embodiments 1 to 3, in which a width of the terminal is greater than a width of the feed line.

Embodiment 5

The antenna according to any one of embodiments 1 to 4, further including, around the radiation conductor, a peripheral conductor spaced away from the radiation conductor so as to extend in a radial direction and a circumferential direction of the radiation conductor.

Embodiment 6

The antenna according to embodiment 5, in which a width of the peripheral conductor in the radial direction is greater than the radius of the radiation conductor.

Embodiment 7

The antenna according to embodiment 5 or 6, in which an inner peripheral edge of the peripheral conductor on an inner side in the radial direction has a shape along an outer peripheral edge of the radiation conductor.

Embodiment 8

The antenna according to any one of embodiments 5 to 7, in which a radius of curvature of an outer peripheral edge of the peripheral conductor on an outer side in the radial direction is larger than a radius of curvature of an inner peripheral edge of the peripheral conductor on an inner side in the radial direction.

Embodiment 9

The antenna according to any one of embodiments 5 to 8, in which a length of an inner peripheral edge of the peripheral conductor on an inner side in the radial direction is less than ¼ of a length of an outer peripheral edge of the radiation conductor.

Embodiment 10

The antenna according to any one of embodiments 1 to 9, in which the radiation conductor and the feed line each have a mesh-like conductor pattern.

Embodiment 11

A display device including the antenna according to any one of embodiments 1 to 10.

REFERENCE SIGNS LIST

21 Radiation conductor
22A, 22B Feed line
23A, 23B Terminal pad portion (terminal)
60A, 60B Peripheral conductor
100 Display device
200 Antenna

What is claimed is:

1. An antenna comprising:
a radiation conductor having a circular shape, a radius and a diameter;
a first feed line configured to feed power to the radiation conductor, the first feed line having a first portion distal from the radiation conductor and a second portion proximal to the radiation conductor, the second portion being inclined with respect to the first portion and connecting between the first portion and the radiation conductor;
a second feed line configured to feed power to the radiation conductor, the second feed line having a third portion distal from the radiation conductor and a fourth portion proximal to the radiation conductor, the fourth portion being inclined with respect to the third portion and connecting between the third portion and the radiation conductor, the third portion being at a distance from and substantially parallel with the first portion; and
a terminal connected to the first feed line, wherein
impedance of the first feed line is greater than impedance of a feed point of the terminal,
a line length of the first feed line is longer than the radius of the radiation conductor, and
the diameter of the radiation conductor is less than the distance.

2. The antenna according to claim 1, wherein the line length of the first feed line is equal to or less than the diameter of the radiation conductor.

3. The antenna according to claim 1, wherein the terminal is a coplanar line.

4. The antenna according to claim 1, wherein a width of the terminal is greater than a width of the first feed line.

5. The antenna according to claim 1, further comprising, around the radiation conductor, a peripheral conductor spaced away from the radiation conductor so as to extend in a radial direction and a circumferential direction of the radiation conductor.

6. The antenna according to claim 5, wherein a width of the peripheral conductor in the radial direction is greater than the radius of the radiation conductor.

7. The antenna according to claim 5, wherein an inner peripheral edge of the peripheral conductor on an inner side in the radial direction has a shape along an outer peripheral edge of the radiation conductor.

8. The antenna according to claim 5, wherein a radius of curvature of an outer peripheral edge of the peripheral conductor on an outer side in the radial direction is larger than a radius of curvature of an inner peripheral edge of the peripheral conductor on an inner side in the radial direction.

9. The antenna according to claim 5, wherein a length of an inner peripheral edge of the peripheral conductor on an inner side in the radial direction is less than ¼ of a length of an outer peripheral edge of the radiation conductor.

10. The antenna according to claim 1, wherein the radiation conductor and the first feed line each have a mesh-like conductor pattern.

11. A display device comprising the antenna according to claim 1.

12. An antenna comprising:
a radiation conductor having a circular shape;
a feed line configured to feed power to the radiation conductor;
a peripheral conductor that is around the radiation conductor and spaced away from the radiation conductor so as to extend in a radial direction and a circumferential direction of the radiation conductor; and
a terminal connected to the feed line, wherein
impedance of the feed line is greater than impedance of a feed point of the terminal,
a line length of the feed line is longer than a radius of the radiation conductor, and
an inner peripheral edge of the peripheral conductor on an inner side in the radial direction has a shape along an outer peripheral edge of the radiation conductor.

13. An antenna comprising:
a radiation conductor having a circular shape;
a feed line configured to feed power to the radiation conductor;
a peripheral conductor that is around the radiation conductor and spaced away from the radiation conductor so as to extend in a radial direction and a circumferential direction of the radiation conductor; and
a terminal connected to the feed line, wherein
impedance of the feed line is greater than impedance of a feed point of the terminal,
a line length of the feed line is longer than a radius of the radiation conductor, and
a length of an inner peripheral edge of the peripheral conductor on an inner side in the radial direction is less than ¼ of a length of an outer peripheral edge of the radiation conductor.

* * * * *